(12) United States Patent
Xu et al.

(10) Patent No.: US 10,365,777 B2
(45) Date of Patent: Jul. 30, 2019

(54) POLARIZER AND DISPLAY DEVICE

(71) Applicant: BOE TECHNOLOGY GROUP CO., LTD., Beijing (CN)

(72) Inventors: Rui Xu, Beijing (CN); Xue Dong, Beijing (CN); Jing Lv, Beijing (CN); Haisheng Wang, Beijing (CN); Chun-Wei Wu, Beijing (CN); Yingming Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 34 days.

(21) Appl. No.: 15/655,951

(22) Filed: Jul. 21, 2017

(65) Prior Publication Data
US 2018/0039354 A1    Feb. 8, 2018

(30) Foreign Application Priority Data

Aug. 3, 2016   (CN) .......................... 2016 1 0629521

(51) Int. Cl.
| | |
|---|---|
| *G06F 3/041* | (2006.01) |
| *H04N 9/04* | (2006.01) |
| *G06F 3/044* | (2006.01) |
| *G02F 1/133* | (2006.01) |
| *G02B 5/30* | (2006.01) |

(52) U.S. Cl.
CPC ........... *G06F 3/044* (2013.01); *G02B 5/3058* (2013.01); *G02B 5/3083* (2013.01); *G06F 3/0412* (2013.01); *G06F 3/0416* (2013.01); *G06F 2203/04103* (2013.01); *G06F 2203/04112* (2013.01)

(58) Field of Classification Search
CPC .............................. G06F 3/044; G02F 1/13338
See application file for complete search history.

(56) References Cited

U.S. PATENT DOCUMENTS

| | | | |
|---|---|---|---|
| 2011/0002040 A1* | 1/2011 | Aoki ...................... | H04N 9/045 |
| | | | 359/489.08 |
| 2015/0015532 A1* | 1/2015 | Choung .................. | G06F 3/044 |
| | | | 345/174 |
| 2016/0231844 A1* | 8/2016 | Lee ....................... | G02F 1/13338 |
| 2016/0283025 A1* | 9/2016 | Yang ...................... | G06F 3/044 |

(Continued)

FOREIGN PATENT DOCUMENTS

| | | |
|---|---|---|
| CN | 102466907 A | 5/2012 |
| CN | 103309094 A | 9/2013 |
| CN | 103353688 A | 10/2013 |

(Continued)

OTHER PUBLICATIONS

First Office Action for Chinese Patent Application No. 201610629521.2 dated Mar. 30, 2018.

*Primary Examiner* — Lin Li
(74) *Attorney, Agent, or Firm* — Calfee, Halter & Griswold LLP (57) ABSTRACT

A polarizer and a display device, which relates to a display technology is provided. The polarizer is divided into a plurality of pattern regions arranged in a two-dimensional direction. The polarizer includes a linear polarization pattern and a touch sensing electrode disposed in the pattern region. The touch sensing electrodes in the different pattern regions are not connected. Polarization pattern and touch sensing electrode are set in the same layer.

16 Claims, 11 Drawing Sheets

(56) References Cited

U.S. PATENT DOCUMENTS

2017/0075471 A1\* 3/2017 Hong ...................... G06F 3/044

FOREIGN PATENT DOCUMENTS

| CN | 103487973 A | | 1/2014 | | |
|----|-------------|---|--------|---|---|
| CN | 105468201 A | | 4/2016 | | |
| CN | 105652504 A | | 6/2016 | | |
| CN | 105739160 A | | 7/2016 | | |
| CN | 105793805 A | | 7/2016 | | |
| KR | 20150029395 A | \* | 3/2015 | ............. | G06F 3/041 |

\* cited by examiner

POLARIZER AND DISPLAY DEVICE

CROSS-REFERENCE TO RELATED APPLICATION

This application claims priority to Chinese Patent Application 201610629521.2, filed Aug. 3, 2016, the entire contents of which are incorporated herein by reference.

TECHNICAL FIELD

The present disclosure relates to the field of display technology, and more particularly to a polarizer and a display device.

BACKGROUND

The polarizer is an optical element having a function of shielding and transmitting an incident light and converting the natural light into polarized light. Since the polarizer may obtain the polarized light by decomposing and selecting the incident light, the polarizer may be widely used in the field of photoelectric display technology. Wire Grid Polarizer (WGP) is a widely used linear polarizer, which is capable of transmitting polarized light in a specific polarization direction, while reflecting the light in an polarization direction orthogonal to said specific polarization direction, thereby it is widely used in a display device having a display function, such as a liquid crystal display, a digital photo album, a mobile phone, or a tablet computer.

It should be noted that the information disclosed in the above-mentioned background section is provided only for a better understanding of the background of the present disclosure, and may therefore contain information that does not form prior art known to those skilled in the art.

SUMMARY

Embodiments of the present disclosure provide a polarizer and a display device.

In order to achieve the above object, the embodiments of the present disclosure employ the following technical solutions.

According to one aspect of the embodiments of the present disclosure, there is provided a polarizer divided into a plurality of pattern regions arranged in a two-dimensional direction, wherein the polarizer includes: linear polarization patterns and touch sensing electrodes provided in the pattern regions, the touch sensing electrodes in different pattern regions are not connected, and the linear polarization patterns and the touch sensing electrodes are arranged in a same layer.

According to another aspect of the embodiments of the present disclosure, there is provided a display device including the above polarizer and a touch circuit, wherein touch sensing electrodes in the polarizer is connected to the touch circuit.

It is to be understood that both the foregoing general description and the following detailed description are exemplary and illustrative only and are not intended to limit the present disclosure.

This section provides an overview of various implementations or examples of the techniques described in this disclosure, and is not intended to be exhaustive of all scopes or all features of the disclosed techniques.

BRIEF DESCRIPTION OF THE DRAWINGS

To explain the technical solutions in the embodiments of the present disclosure or in the related art more clearly, hereinafter, the drawings required for describing the embodiments or the related art will be introduced simply. Obviously, the drawings described below are only some embodiments of the present disclosure. For the person skilled in the art, other drawings may be obtained according to these drawings without paying inventive labor.

DETAILED DESCRIPTION

Hereinafter, the technical solutions in the embodiments of the present disclosure will be described clearly and completely in conjunction with the accompanying drawings in the embodiments of the present disclosure, and it will be apparent that the described embodiments are merely part of the embodiments of the present disclosure and not all of the embodiments. All other embodiments obtained by those skilled in the art based on the embodiments of the present disclosure without paying inventive work are within the protection scope of the present disclosure.

REFERENCE SIGNS

Figure 1A:
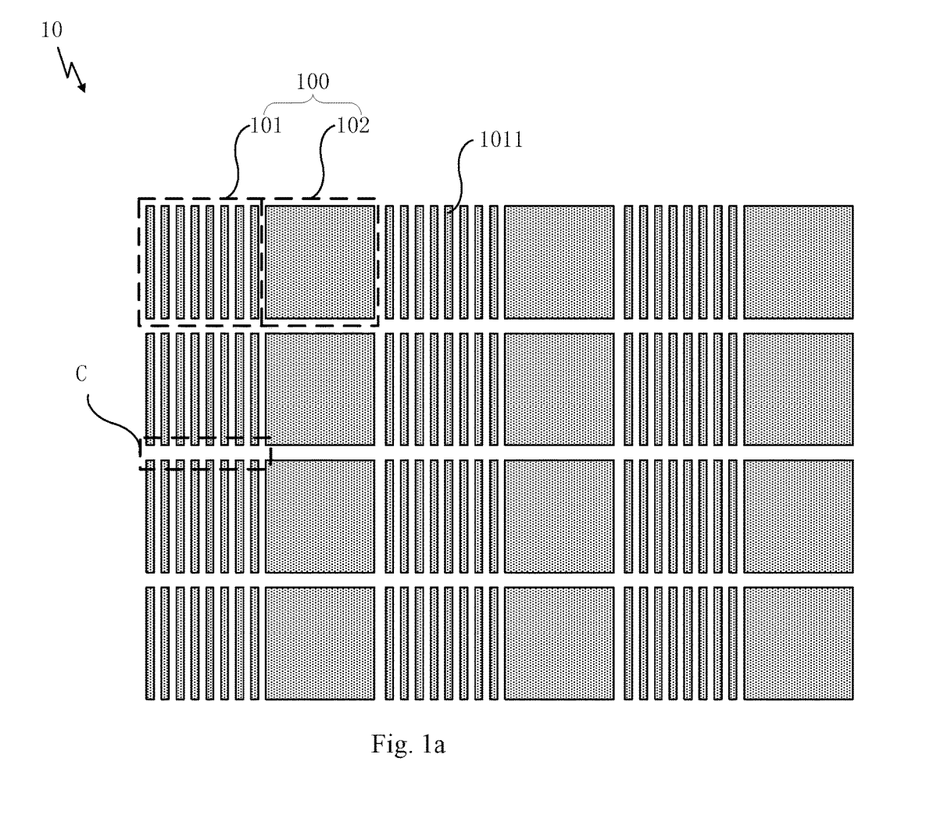
FIG. 1a is a schematic diagram of a structure of a polarizer provided by an embodiment of the present disclosure.

10: polarizer, 11: insulating film, 20: display panel, 100: pattern group, 101: linear polarization pattern, 1011: metal strip, 1012: connecting line, 102: touch sensing electrode, 200: insulating layer, 201: cathode layer, 202: organic light emitting layer, 301: sub-pixel unit, 302: black matrix, L: signal line The embodiments of the present disclosure provide a polarizer. As shown in FIG. 1a, the polarizer 10 is divided into a plurality of pattern regions 100 arranged in a two-dimensional direction. The polarizer 10 includes linear polarization patterns 101 and touch sensing electrodes 102 provided in the pattern regions 100, the touch sensing electrodes 102 in different pattern regions 100 are not connected, and the linear polarization patterns 101 and the touch sensing electrodes 102 are arranged in a same layer.

Figure 1B:
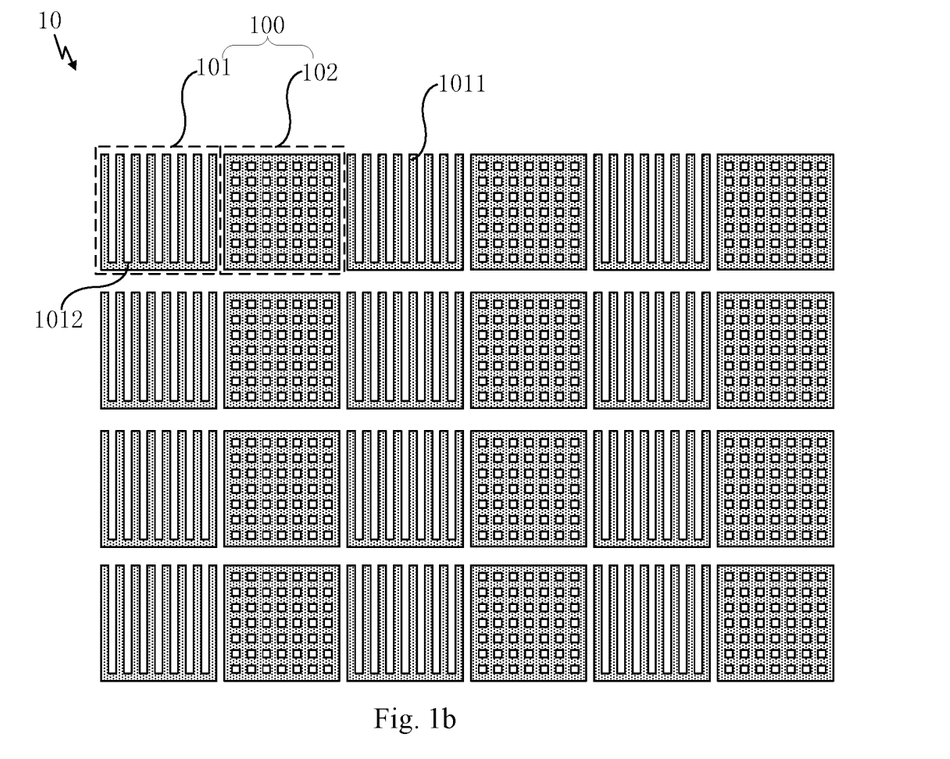
FIG. 1b is a schematic diagram of a structure of another polarizer provided by the embodiment of the present disclosure.

It is to be noted that, first, in the present disclosure, the linear polarization pattern 101 may be composed of a set of parallel metal strips 1011 as shown in FIG. 1a. Alternatively, as shown in FIG. 1b, the linear polarization pattern 101 may be composed of a set of parallel metal strips 1011, and the plurality of parallel metal strips 1011 are connected by a connecting line 1012. The present disclosure is not limited thereto.

Figure 2A:
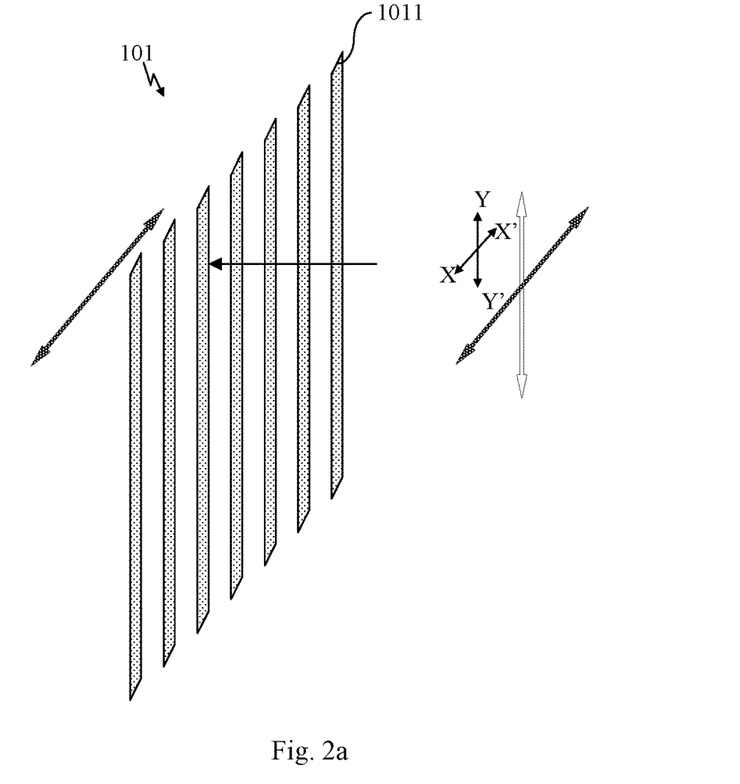
FIG. 2a is a schematic diagram of a polarizing principle of a linear polarization pattern in the polarizer provided by the embodiment of the present disclosure.

Specifically, the process of obtaining the polarized light by the above-mentioned linear polarization pattern 101 composed of a set of parallel metal strips 1011 is as follows: as shown in FIG. 2a, an electric field vector of an ordinary incident ray may be decomposed into a light vector in a parallel direction (X-X') of the metal strips 1011 in the polarization pattern 101 and a light vector in a vertical direction (Y-Y') of the metal strips 1011, the light vector in the parallel direction (X-X') of the metal strips 1011 is reflected by the polarization pattern 101 and cannot transmit through the polarization pattern 101, and the light vector in the vertical direction (Y-Y') of the metal strip 1011 can transmit through the polarization pattern 101, thereby the incident light may be divided by the polarization pattern 101 to obtain the polarized light in the vertical direction of the metal strips 1011 in the polarization pattern 101.

Figure 1C:
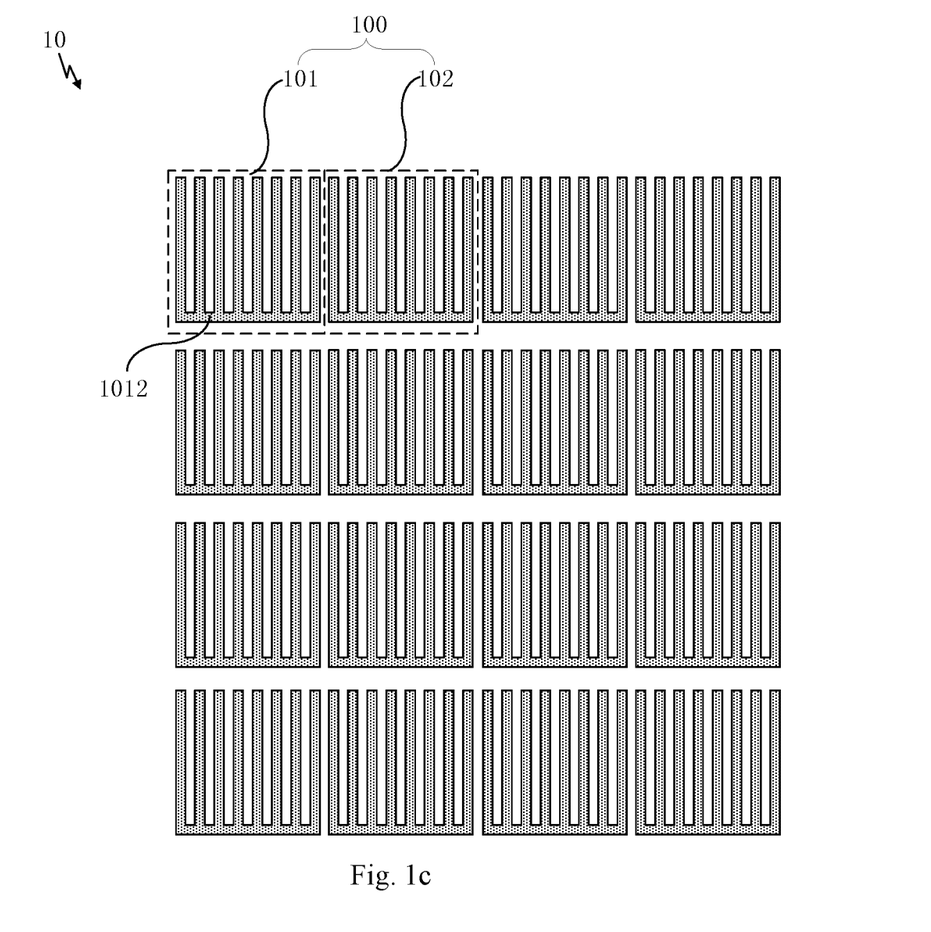
FIG. 1c is a schematic diagram of a structure of further another polarizer provided by the embodiment of the present disclosure.

Second, in the present disclosure, the touch sensing electrode 102 may be a planar structure as shown in FIG. 1a, or may be a mesh structure as shown in FIG. 1b, or may be a group of parallel metal strips 1011 connected by a connecting line 1012 as shown in FIG. 1c, i.e., a comb-like structure. The present disclosure is not limited thereto, as long as an excitation signal applied to the touch sensing electrode 102 can be detected by the touch sensing electrode 102.

Figure 2B:
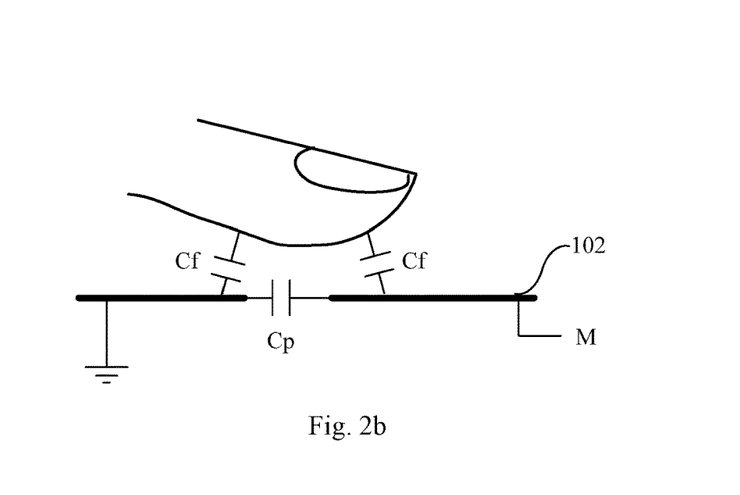
FIG. 2b is a schematic diagram of a touch control principle of a touch sensitive electrode in the polarizer provided by the embodiment of the present disclosure.

Specifically, the process of detecting the excitation signal applied to the touch sensing electrode 102 by the touch sensing electrode 102 is as follows: as shown in FIG. 2b, the touch sensing electrode 102 is grounded at one end and is connected to a signal terminal M at the other end, when a signal (e.g., a voltage) is inputted to the touch sensing electrode 102 through the signal terminal M, the touch sensing electrode 102 itself forms a capacitance. At this time, when the excitation signal is applied to the touch sensing electrode 102, taking a finger as an example, since a human body itself is equivalent to an electric field, when the finger is pressed onto the touch sensing electrode 102, a coupling capacitance Cf is formed between the human body and the touch sensing electrode, and the coupling capacitance Cf is superimposed with the capacitance Cp of the touch sensing electrode 102 itself, so that the capacitance on the touch sensing electrode 102 changes.

On the basis of this, the above-mentioned detection of the excitation signal applied to the touch sensing electrode 102 by the touch sensing electrode 102 is performed by detecting the change condition of the capacitance of the touch sensing electrode 102 itself before and after the application of the excitation signal. Since the capacitance of the touch sensing electrode 102 with the planar structure is larger than that of the touch-sensitive induction electrode 102 with the mesh structure, the excitation signal applied to the touch sensing electrode 102 with the planar structure is easily to be detected, thereby the sensitivity of the touch sensing electrode 102 is improved. Therefore, the touch sensing electrode 102 having the planar structure is preferable in the present disclosure.

Third, in the present disclosure, the structures of the linear polarization pattern 101 and the touch sensing electrode 102 may be different. For example, as shown in FIG. 1b, the linear polarization pattern 101 has the comb-like structure, and the touch sensing electrode 102 has the mesh structure. The structures of the linear polarization pattern 101 and the touch sensing electrode 102 may be the same, for example, as shown in FIG. 1c, the linear polarization pattern 101 and the touch sensing electrode 102 have the same structure, i.e., both have the comb-like structure. The present disclosure is not limited thereto.

Figure 3:
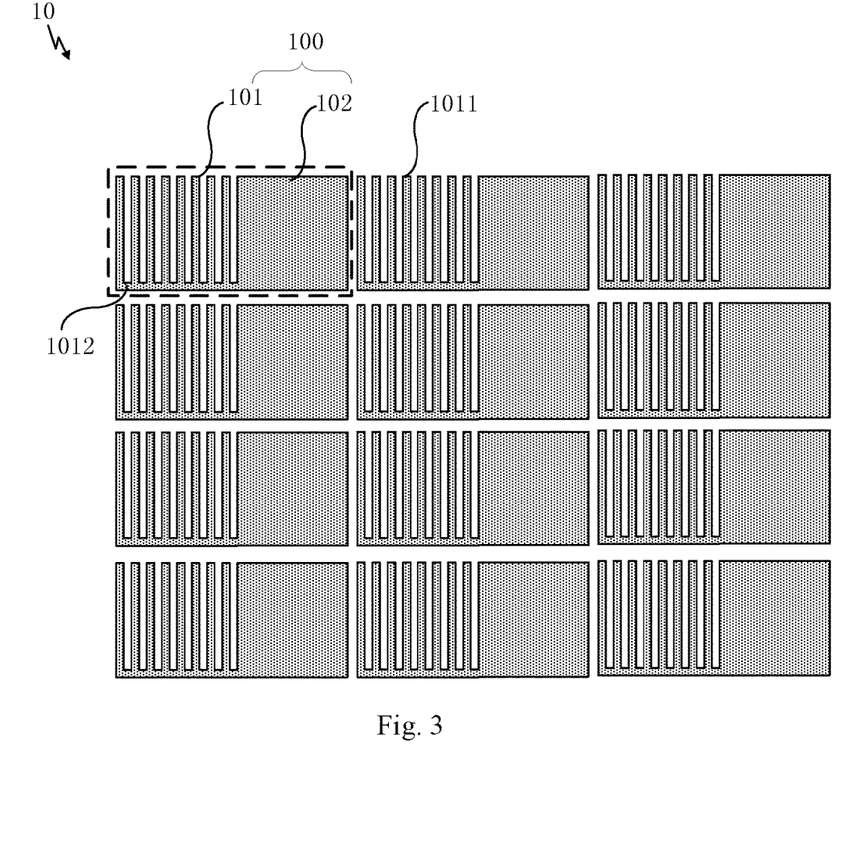
FIG. 3 is a schematic diagram of a structure of another polarizer provided by an embodiment of the present disclosure.

Fourth, as shown in FIG. 1a or FIG. 1b, the linear polarization pattern 101 and the touch sensing electrode 102 may not be connected in the pattern region 100. Alternatively, as shown in FIG. 3, the linear polarization pattern 101 and the touch sensing electrode 102 may be connected. The present disclosure is not limited thereto.

On the basis of this, when the linear polarization pattern 101 and the touch sensing electrode 102 located in the same pattern region 100 are connected to each other, the polarized light may be obtained by the polarization pattern 101, and at the same time, the polarization pattern 101 may be used as a part of the touch sensing electrode 102 to further increase the capacitance of the touch sensing electrode 102 itself, so that the excitation signal applied to the touch sensing electrode 102 is easy to be detected and the sensitivity of the touch sensing electrode 102 is improved. Therefore, in the present disclosure, it is preferable that as shown in FIG. 3, when the linear polarization pattern 101 is composed of a set of parallel metal strips 1011 and the set of parallel metal strips 1011 are connected by the connecting line 1012, the linear polarization pattern 100 and the touch sensing electrode 102 in the same pattern region 100 are connected.

Further, in order to avoid the decrease of an acquisition rate of the polarized light by the linear polarization pattern 101 when the connection line 1012 is connected from an intermediate region of a group of parallel metal strips 1011, it is preferable that, as shown in FIG. 3, the connection line 1012 is provided at the end of the group of parallel metal strips 1011 in the linear polarization pattern 101, i.e., the linear polarization pattern 101 has the comb-like structure, so as to reduce the influence of the connecting line 1012 on the acquisition rate of the polarized light by the linear polarization pattern 101.

In addition, in order to obtain the polarized light with the same direction by the above polarizer 10, transmission axis directions of the linear polarization patterns 101 in individual pattern regions 100 may be set to have the same direction, that is, wire grid directions in the linear polarization pattern 101 in individual pattern regions 100 are parallel. In this way, when the incident light is incident on the polarizer 10, the light rays passing through all the linear polarization patterns 101 are converted into the polarized light with the same direction.

The polarizer includes a plurality of pattern regions arranged in a two-dimensional direction, and the pattern group includes a linear polarization pattern and a touch sensing electrode provided in the same layer. On one hand, since the light vector with the electric field vector parallel to the wire grid direction of the polarization pattern in the incident light is reflected by the polarization pattern and cannot pass through the polarization pattern, and the light vector with the electric field vector perpendicular to the wire grid direction (the transmission axis direction) in the incident light can pass through the polarization pattern, it is possible to obtain the polarized light with the electric field vector perpendicular to the wire grid by the polarization pattern in the polarizer. On the other hand, when an excitation signal is applied to the non-connected touch sensitive electrode in the pattern region, the capacitance of the touch sensing electrode itself changes. On the basis of this, the thickness of the polarizer is relatively small, and the thickness of the polarizer is greatly reduced with respect to the ordinary polarizer overlaid with the touch panel in the related art, in this way, when the polarizer is applied to a display device, it is possible to reduce the thickness of the display device while realizing the polarized light and the touch sensing.

In addition, the sub-pixel units are mostly distributed in a form of matrix in the conventional display devices, thereby in order to adapt the polarizer 10 to the majority of the display devices, it is preferable for the present disclosure that, as shown in FIG. 1a, the pattern region 100 is distributed in a form of matrix, and the relative positions of the linear polarization pattern 101 and the touch sensing electrode 102 in the respective pattern regions 100 are coincided.

Figure 4:
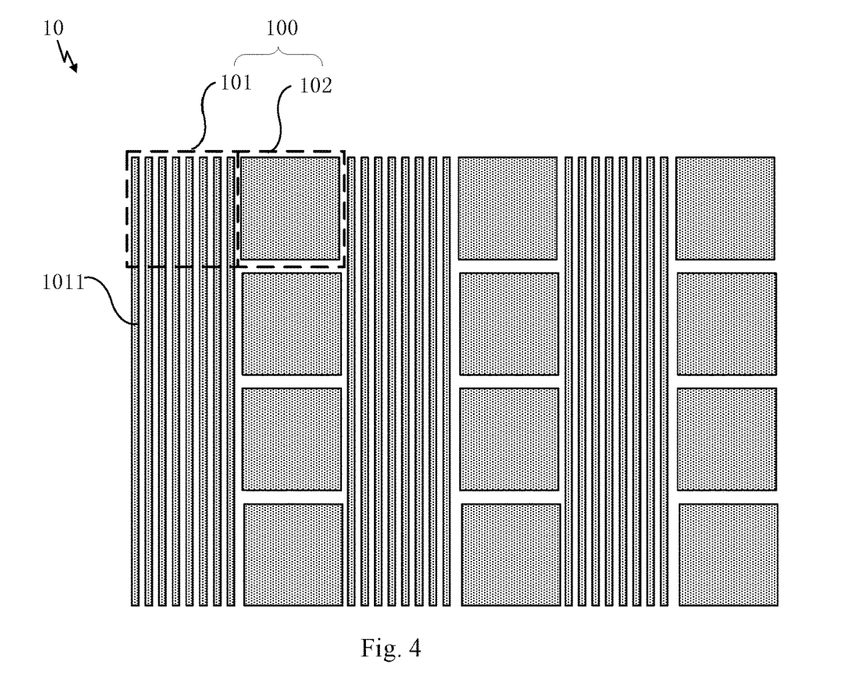
FIG. 4 is a schematic diagram of a structure of further another polarizer provided by the embodiment of the present disclosure.

On the basis of this, as shown in FIG. 1a, when the linear polarization pattern 101 and the touch sensing electrode 102 in the same pattern region 100 are not connected and the linear polarization pattern 101 is composed of a set of parallel metal strips 1011, there might be a certain void region C between the linear polarization patterns 101 in adjacent different pattern regions 100, and there is no polarization pattern in the void region C so that when a portion of the light is incident on the void region C, the light cannot be converted into the polarized light, which reduce the acquisition rate of the polarized light obtained by the polarizer 10. In this case, it is preferable that, as shown in FIG. 4, the metal strips 1011 in every two adjacent linear polarization patterns 101 are connected to each other in an extending direction of the metal strips 1011 to form a group of parallel strip structures. In this way, the acquisition rate of the polarized light by the polarizer can be improved.

In addition, in the present disclosure, the method for preparing the polarizer 10 described above may be carried out by electron beam lithography, nanoimprinting, X-ray lithography, holographic lithography, or the like, which is not limited by the present disclosure. For any of the above-described preparation methods, it is preferable in the present disclosure that the material of the linear polarization pattern 101 is the same as that of the touch sensing electrode 102. In this way, the linear polarization pattern 101 and the touch sensing electrode 102 may be formed by the same manufacturing process, which can achieve the purpose of simplifying the process and reducing the production cost.

The preparation method of the polarizer 10 will be described below with the holographic lithography technique as an example.

First, a metal material is deposited on a substrate by vapor deposition, and the metal material may be aluminum or copper, or may be an alloy material; it may be a single metal layer, such as an aluminum metal layer or a copper metal layer, or it may be a composite metal layer obtained by depositing a layer of an aluminum metal layer and then vapor-depositing a layer of a copper metal layer. The present disclosure is not limited thereto.

Next, a photoresist is coated on the above-prepared metal layer. It is possible to drop a photoresist solution onto the above-mentioned metal layer at 90° C., and then spread the solution out with a highly rotating centrifugal force over the metal layer, so as to form a uniform photoresist film on the metal layer. The thickness of the photoresist film may be controlled by adjusting a concentration of the photoresist solution and the rotational speed.

Then, an incident angle of the light is calculated according to the desired pattern to produce a corresponding interference fringe, and the photoresist film coated on the metal layer is exposed. After that, the exposed semi-finished product is placed in a developer and subjected to development for a period of time to obtain a photoresist grating mask.

Finally, the photoresist grating mask is placed in an ion beam etching machine, and ion beam etching parameters are set. For example, the photoresist grating mask is etched by using argon as the working gas, using 300 eV ion energy, 80-160 mA ion beam current, and etc., so as to obtain the patterns of the desired linear polarization pattern 101 and the touch sensing electrode 102.

The above polarizer 10 may further include a quarter-wave plate (¼ wave plate). In this case, the quarter-wave plate may be disposed at a side of the plurality of pattern regions when the light is incident on the polarizer 10, the light rays passing through the linear polarization pattern 101 in the polarizer 10 are converted into the polarized light, and after the polarized light passes through the quarter-wave plate, the polarized light is converted into an elliptical polarized light or circular polarized light.

Figure 5:
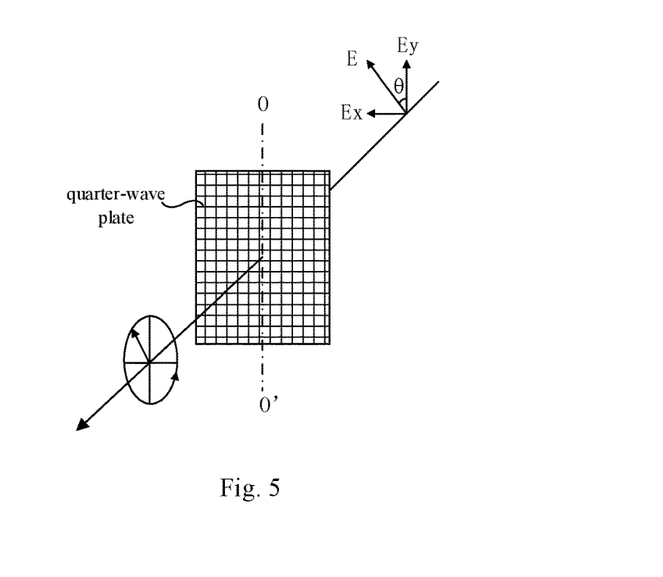
FIG. 5 is a schematic diagram of an optical rotation of a quarter-wave plate provided by an embodiment of the present disclosure.

Hereinafter, a further explanation of how the light is converted into the elliptical polarized light or circular polarized light by the above polarizer 10 is given. Specifically, as shown in FIG. 5, when the polarized light E passing through the linear polarization pattern 101 is incident on the quarter-wave plate, there is a certain phase difference between a vibration component Ex of the polarized light E in a direction perpendicular to an optical axis O-O' of the ¼ wave plate and a vibration component Ey of the polarized light E in a direction parallel to the optical axis O-O', thereby an exit light after the polarized light E passed through the ¼ wave plate may be converted into an elliptical polarized light. In practical applications, an angle θ between the polarized light E and the optical axis O-O' direction may be controlled to be 45°, so as to obtain the circular polarized light.

Figure 6A:
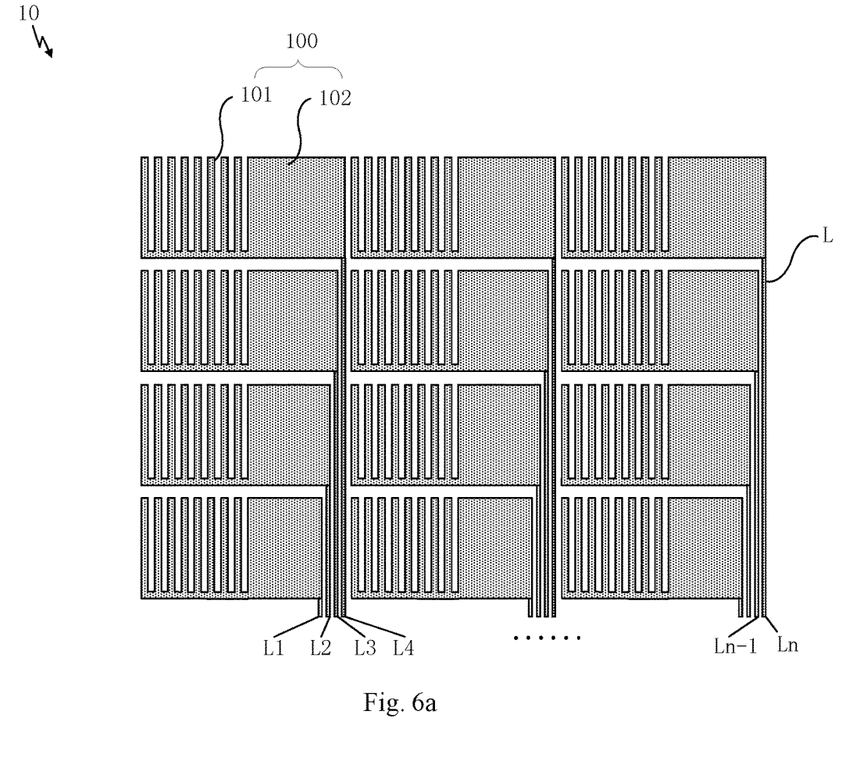
FIG. 6a is a schematic diagram of a structure of a polarizer including a signal line provided by an embodiment of the present disclosure.

Further, as shown in FIG. 6a, the above polarizer 10 may further include a signal line L, and the signal line L is connected to the touch sensing electrode 102 so that signals may be inputted into and outputted from the touch sensing electrode 102 through the signal line L.

The manner of setting the signal line L will be described below.

For example, as shown in FIG. 6a, the signal line L may be arranged in the same layer as the touch sensing electrode 102, so that the touch detection can be achieved without increasing the thickness of the polarizer 10.

It should be noted that the signal line L is arranged in the same layer as the touch sensing electrode 102, and the signal line L is distributed in an area between the adjacent touch sensing electrodes 102. For the large-sized polarizer 10, since a large number of touch sensing electrodes 102 are present in the polarizer 10 and the signal lines (L1, L2 . . . Ln) are connected to each of the touch sensitive electrodes 102, it is possible that the sizes of the touch sensing electrodes 102 need to be reduced due to insufficient area between the adjacent touch sensitive electrodes 102. For example, as shown in FIG. 6a, it is necessary to reduce the sizes of the touch sensing electrodes 102 connected to the signal lines L4, L3, L2, and L1 in turn, so as to increase the areas between the adjacent touch sensing electrodes 102 for distributing the signal lines L.

Figure 6B:
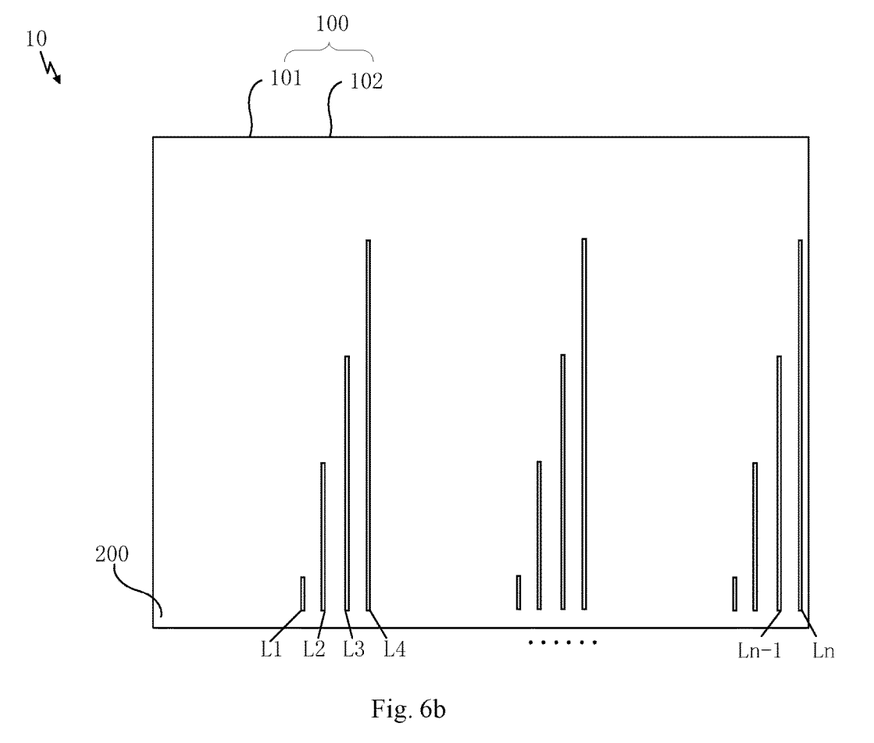
FIG. 6b is a schematic diagram of a structure of another polarizer including a signal line provided by an embodiment of the present disclosure.

For another example, as shown in FIG. 6b, the signal line L may be provided in a different layer from the touch sensing electrode 102. Specifically, an insulating layer 200 is first formed on the layer of the touch sensing electrode 102, then a signal line L is formed on the insulating layer 200, and the signal line L is connected to the touch sensing electrode 102 through a via hole. The insulating layer 200 may be made of a transparent resinous material.

Here, it is to be noted that in the above-described arrangement manner of arranging the signal line L and the touch sensing electrode 102 in different layers, since the signal lines L themselves are located on one layer, the requirement by various sizes of polarizers 10 can be satisfied; however, due to the arrangement of the signal line L and the touch sensing electrode 102 in different layers, it is necessary to add the insulating layer 200 to the original touch sensing electrode 102, and to form the signal line L layer on the insulating layer 200, the thickness of the polarizer 10 may increase properly.

As described above, the setting of the signal line L may be selected according to the actual needs. For example, for the polarizer 10 having an ordinary size, the manner of arranging the signal line L and the touch sensing electrode 102 in the same layer as shown in FIG. 6a may be adopted. For the large-sized polarizer 10, the manner of arranging the signal line L and the touch sensing electrode 102 in different layers as shown in FIG. 6b may be adopted. The present disclosure is not limited thereto.

According to another aspect of the embodiments of the present disclosure, there is provided a display device including any one of the above polarizers and a touch circuit, and the touch sensing electrodes in the polarizer are connected to the touch circuit. The display device includes the above-described polarizer, and has the same structure and advantageous effects as the polarizer provided in the foregoing embodiments. Since the structure and the advantageous effects of the polarizer have been described in detail in the foregoing embodiments, they will not be elaborated here.

Figure 7A:
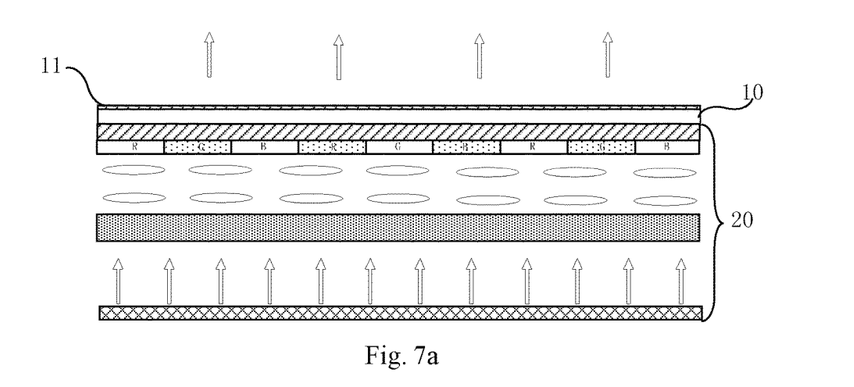
FIG. 7a is a schematic diagram of an LCD structure including the polarizer provided by the embodiment of the present disclosure.

Further, as shown in FIG. 7a, the above-described display device further includes a display panel 20, the polarizer 10 is located on a light-emitting side of the display panel 20, and an insulating film 11 is affixed to the polarizer 10.

It is to be noted that when the polarizer 10 is positioned on the light-emitting side of the display panel 20, by adhering the insulating film 11 to the polarizer 10, it is possible to prevent the finger from directly contacting the touch sensing electrodes 102 in the polarizer 10, and the insulating film 11 can also prevent the linear polarization patterns 101 and the touch sensing electrodes 102 in the polarizer 10 from coming into direct contact with the outside environment, so that the linear polarization pattern 101 and the touch sensing electrode 102 can be protected to a certain extent. In addition, the insulating film 11 itself has a better flexibility than the glass cover in the related art, which is advantageous for the application of the polarizer 10 to a flexible touch display device.

Hereinafter, the polarizer 10 being located at the light-emitting side of the display panel 20 will be further explained.

For example, as shown in FIG. 7a, when the display panel 20 is used to constitute an LCD (Liquid Crystal Display), the polarizer 10 is located on the light-emitting side of the display panel 20. In this case, the polarizer 10 can realize the functions of polarizing and touching at the same time. Compared with the related art in which an upper polarizer is provided on the light-emitting side of the display panel 20 and the touch screen is bonded by an optical adhesive layer, the polarizer 10 of the present disclosure can achieve the same effect, and in addition to this, since the thickness of the polarizer 10 is equivalent to only the thickness of the conventional upper polarizer, and it is unnecessary to provide the touch screen, the thickness of the display device may be significantly reduced.

Figure 7B:
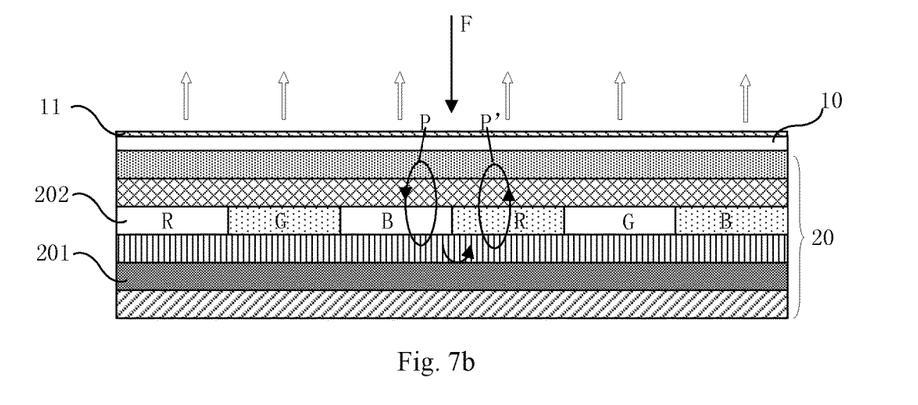
FIG. 7b is a schematic diagram of an OLED structure including the polarizer provided by the embodiment of the present disclosure.

For another example, as shown in FIG. 7b, when the display panel 20 is used to constitute an OLED (Organic Light Emitting Display), the polarizer 10 is located on the light-emitting side of the display panel 20. The display panel 20 includes an organic light emitting layer 202 and a cathode layer 201, an anode layer, an electron transport layer, a hole transport layer, and a package glass or a package film (not shown in the drawings) located on both sides of the organic light emitting layer.

In most cases, the cathode layer 201 is made of a metal material. In this way, when an outside light is incident on the display panel 20, the cathode layer 201 has a certain reflection effect on the light, and the reflected light may be mixed with the light emitted by the organic light emitting layer 202, thereby a mixed color phenomenon is occurred, and the color contrast of the display panel 20 may be reduced. In order to solve this technical problem, in the related art, a circular polarizer is additionally provided at the light-emitting side of the display panel 20 so that the outside light passes through the circular polarizer and becomes left-handed polarized light or right-handed polarized light, and the rotation directions of the left-handed polarized light or the right-handed polarized light having been reflected will change, and cannot pass through the circular polarizer again, so as to avoid the influence of the outside light on the color contrast of the display panel 20.

When the above-mentioned OLED includes the polarizer 10, as shown in FIG. 7b, for example, the outside light converts into the left-handed polarized light P after passing through the polarizer 10, in this case, the left-handed polarized light P is reflected by the cathode layer 201 and then is converted into a right-handed polarized light P', and the right-handed polarized light P' cannot pass through the polarizer 10 again, so that the color mixing phenomenon can be avoided, and the color contrast of the display panel 20 can be improved.

On the basis of this, in order to realize the touch display, in the related art, it is necessary to provide a touch panel which is bonded to the circular polarizer by an optical glue at the light-emitting side of the display panel 20, while in the present disclosure, the polarizer 10 including the ¼ wave plate can realize the touch display while avoiding the occurrence of the color mixing phenomenon, and since the thickness of the polarizer 10 is equivalent to only the thickness of the circular polarizer in the related art, and it is not necessary to provide a touch screen, the thickness of the display device can be greatly reduced. In addition, the touch panel of the related art cannot be manufactured as a flexible touch screen; however, the polarizer 10 of the present disclosure is preferably flexible so as to facilitate the application of the polarizer 10 to a flexible touch display device.

Figure 8A:
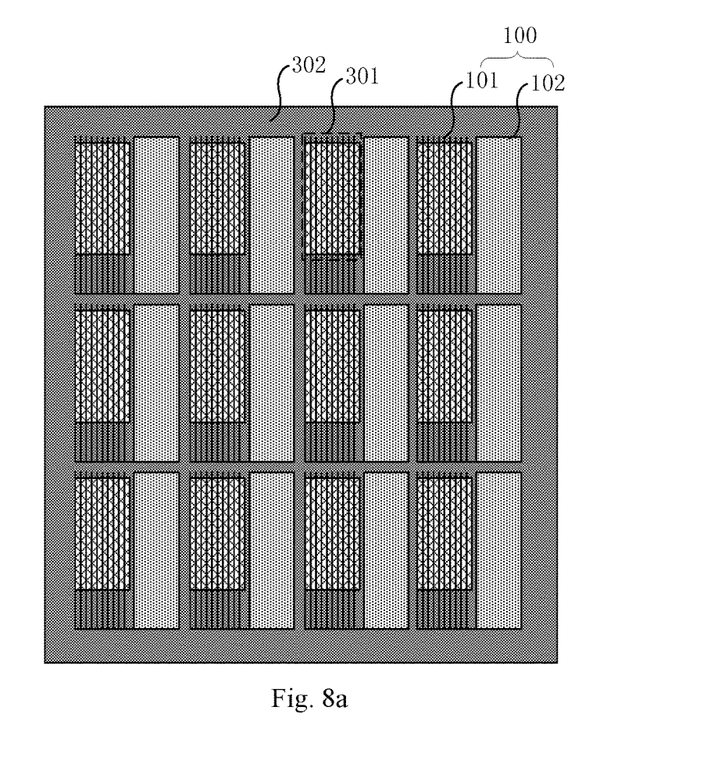
FIG. 8a is a schematic diagram of a structure of a pixel unit corresponding to the polarizer provided by the embodiment of the present disclosure.

In addition, as shown in FIG. 8a, when the above-described display device includes a sub-pixel unit 301 and a black matrix 302 surrounding the sub-pixel unit 301, each of the linear polarization patterns 101 in the polarizer 10 corresponds to at least one sub-pixel unit 301, and the touch sensing electrode 102 in the polarizer 10 is located in an area where the black matrix 302 is located.

Figure 8B:
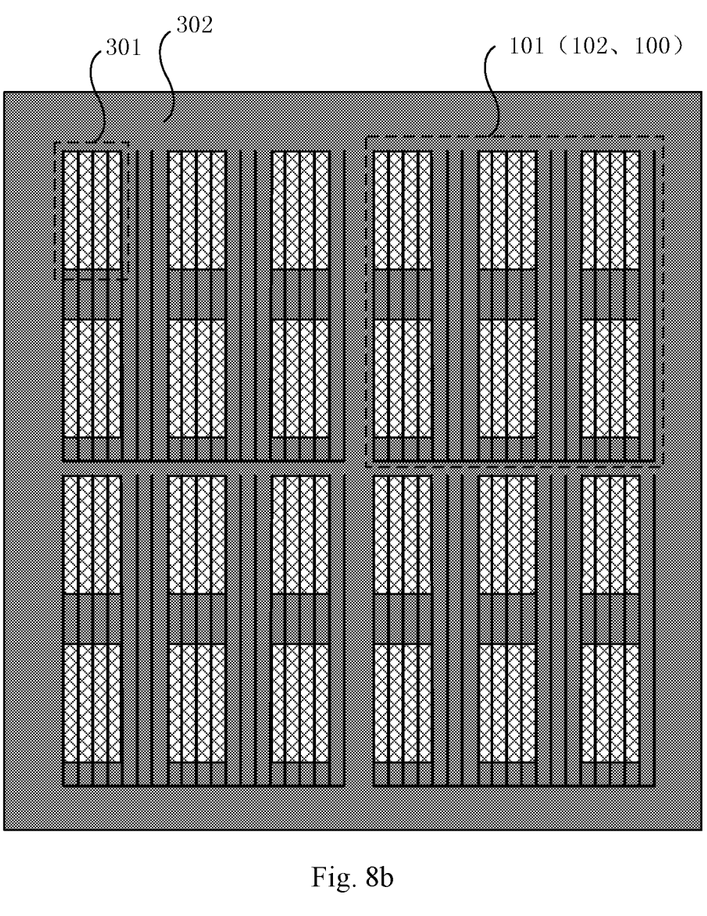
FIG. 8b is a schematic diagram of a structure of another pixel unit corresponding to the polarizer provided by the embodiment of the present disclosure.

Here, it is to be noted that each of the linear polarizing patterns 101 in the polarizer 10 corresponds to at least one sub-pixel unit 301, may be construed as that in this display device, one pattern region 100 in the polarizer 10 may correspond to one pixel unit 301 and the black matrix 302 adjacent to this pixel unit 301 as shown in FIG. 8a; or may be construed as that one pattern region 100 in the polarizer 10 may correspond to a plurality of pixel units 301 and the black matrix 302 between the plurality of pixel units 301 as shown in FIG. 8b. In the present disclosure, the correspondence setting of one pattern region 100 to the pixel unit 301 and the black matrix 302 in the display device is not limited, as long as the linear polarization pattern 102 is located at the position corresponding to the pixel unit 301, and can polarize the light passed through the pixel region 301.

Figure 9:
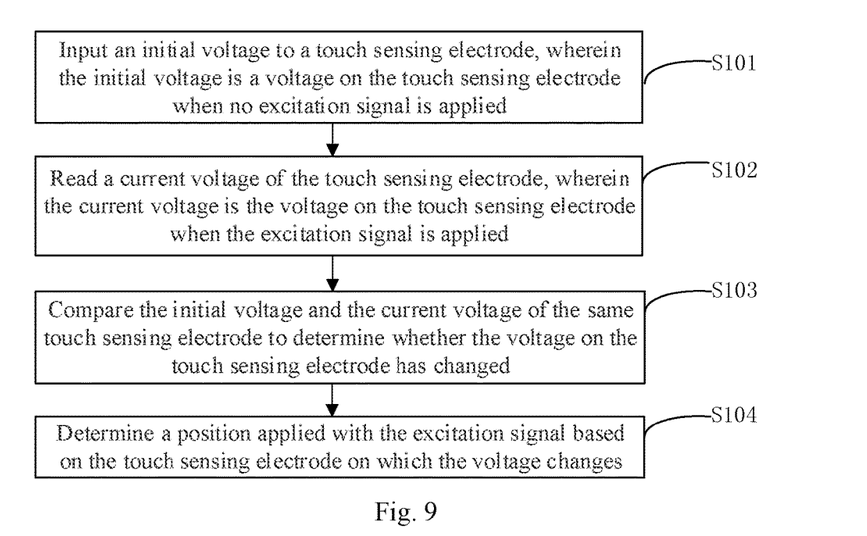
FIG. 9 is a schematic diagram of a touch detection method provided by an embodiment of the present disclosure.

The embodiments of the present disclosure also provide a touch detection method using the above-described display device. As shown in FIG. 9, the touch detection method includes the following steps.

In step S101, an initial voltage is inputted to a touch sensing electrode 102, wherein the initial voltage is a voltage on the touch sensing electrode 102 when no excitation signal is applied.

In step S102, a current voltage of the touch sensing electrode 102 is read, wherein the current voltage is the voltage on the touch sensing electrode 102 when the excitation signal is applied.

In step S103, the initial voltage and the current voltage of the same touch sensing electrode 102 are compared to determine whether the voltage on the touch sensing electrode 102 has changed.

In step S104, a position applied with the excitation signal is determined based on the touch sensing electrode 102 on which the voltage changes.

Figure 10:
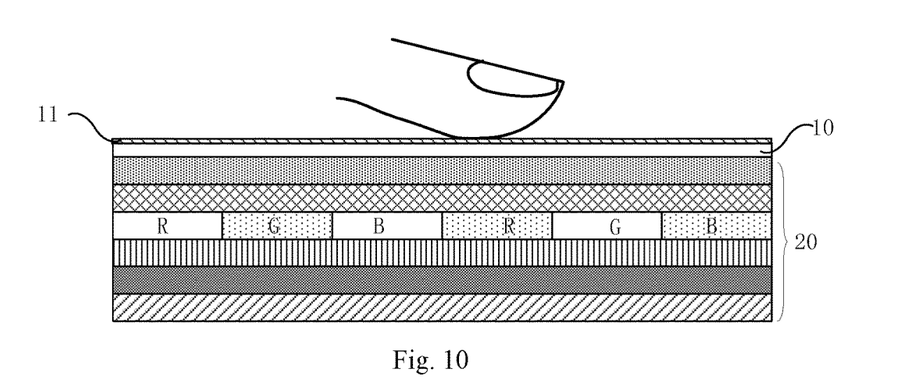
FIG. 10 is a schematic diagram showing a structure of a display device for finger touch provided by an embodiment of the present disclosure.

Specifically, as shown in FIG. 10, for example, in a case that an excitation signal applied to the touch sensitive electrode 102 is implemented by touching the touch sensing electrode 102 by a finger, the further explanation to the above touch detection is given.

First, when the finger is not touching the touch sensing electrode 102 in the display device, an initial voltage V0 is inputted to the touch sensing electrode 102, and at this time, the voltage on the touch sensing electrode 102 is the initial voltage V0.

Then, when the finger touches the touch sensing electrode 102 in the display device, a coupling capacitance is formed between the human body and the touch sensing electrode 102 due to the electric field of the human body itself, and the coupling capacitance may be superimposed on the capacitance of the touch sensing electrode 102 itself when the finger is not touching the touch sensing electrode 102. In this way, the capacitance on the touch sensing electrode 102 changes, and a current voltage V1 of the touch sensing electrode 102 is read, at this time, the voltage on the touch sensitive electrode 102 is the current voltage V1.

Next, the initial voltage V0 and the current voltage V1 of the same touch sensing electrode 102 before and after the finger touch are compared to determine whether or not the voltage on the touch sensing electrode 102 has changed.

Finally, a touch position of the finger is determined according to whether or not the voltage on the touch sensing electrode 102 has changed.

It should be noted that the above description is only a description of the touch position detection method. Since the polarizer 10 of the present disclosure includes a plurality of pattern regions 100 and each pattern region 100 includes the touch sensing electrode 102, when the polarizer 10 is applied to a display device, it is possible to realize a single touch control, or a multi-touch touch.

The embodiments of the present disclosure provide a polarizer and a display device. The polarizer is divided into a plurality of pattern regions arranged in a two-dimensional direction, and includes: linear polarization patterns and touch sensing electrodes disposed in the pattern regions, the touch sensing electrodes in different pattern regions are not connected, and the linear polarization patterns and the touch sensing electrodes are arranged in a same layer.

The polarizer includes a plurality of pattern regions arranged in a two-dimensional direction, and the pattern group includes a linear polarization pattern and a touch sensing electrode provided in the same layer. On one hand, since the light vector with the electric field vector parallel to the wire grid direction of the polarization pattern in the incident light is reflected by the polarization pattern and cannot pass through the polarization pattern, and the light vector with the electric field vector perpendicular to the wire grid direction (the transmission axis direction) in the incident light can pass through the polarization pattern, it is possible to obtain the polarized light with the electric field vector perpendicular to the wire grid by the polarization pattern in the polarizer. On the other hand, when an excitation signal is applied to the non-connected touch sensitive electrode in the pattern region, the capacitance of the touch sensing electrode itself changes. On the basis of this, the thickness of the polarizer is relatively small, and the thickness of the polarizer is greatly reduced with respect to the ordinary polarizer overlaid with the touch panel in the related art, in this way, when the polarizer is applied to a display device, it is possible to reduce the thickness of the display device while realizing the polarized light and the touch sensing.

The foregoing is merely specific implementations of the present disclosure, and the protection scope of the present disclosure is not limited thereto. Modifications and substitution which may be easily made by those skilled in the art within the technical scope disclosed by the present disclosure should all fall within the protection scope of the present disclosure. Therefore, the protection scope of the present disclosure should be defined by the protection scope of the claims.

What is claimed is:

1. A polarizer being divided into a plurality of pattern regions arranged in a two-dimensional direction, the polarizer comprising: linear polarization patterns and touch sensing electrodes disposed in the pattern regions, the touch sensing electrodes in different pattern regions are not connected, and the linear polarization patterns and the touch sensing electrodes are arranged in a same layer, wherein the pattern regions are distributed in a form of matrix, and relative positions between the linear polarization patterns and the touch sensing electrodes in individual pattern regions are consistent, and wherein in a case that the linear polarization pattern and the touch sensing electrode in the same pattern region are not connected and the linear polarization pattern is composed of a set of parallel metal strips, the metal strips in every two adjacent linear polarization patterns along an extending direction of the metal strips are connected to each other to form a set of parallel stripe structures.

2. The polarizer according to claim 1, wherein a material of the linear polarization pattern is the same as that of the touch sensing electrode.

3. The polarizer according to claim 1, wherein the linear polarization pattern is composed of a set of parallel metal strips, the set of parallel metal strips are connected by a connecting line, and the linear polarization pattern and the touch sensing electrode in the same pattern region are connected.

4. The polarizer according to claim 3, wherein the connecting line is located at an end of said set of parallel metal strips.

5. The polarizer according to claim 1, wherein the touch sensing electrode has at least one of following structures: a planar structure, a mesh structure, and a set of parallel metal strips connected by one connecting line.

6. The polarizer according to claim 1, further comprising: a plurality of signal lines connected to the touch sensing electrodes.

7. The polarizer according to claim 6, wherein the signal lines and the touch sensing electrodes are provided in the same layer.

8. The polarizer according to claim 1, wherein transmission axis directions of the linear polarization patterns in individual pattern regions are consistent.

9. The polarizer according to claim 1, further comprising: a quarter-wave plate disposed at a side of the plurality of pattern regions.

10. A display device, comprising a polarizer and a touch circuit, and touch sensing electrodes in the polarizer being connected to the touch circuit, wherein the polarizer is divided into a plurality of pattern regions arranged in a two-dimensional direction, the polarizer comprises: linear polarization patterns and the touch sensing electrodes disposed in the pattern regions, the touch sensing electrodes in different pattern regions are not connected, and the linear polarization patterns and the touch sensing electrodes are arranged in a same layer, wherein the pattern regions are distributed in a form of matrix, and relative positions between the linear polarization patterns and the touch sensing electrodes in individual pattern regions are consistent, and wherein in a case that the linear polarization pattern and the touch sensing electrode in the same pattern region are not connected and the linear polarization pattern is composed of a set of parallel metal strips, the metal strips in every two adjacent linear polarization patterns along an extending direction of the metal strips are connected to each other to form a set of parallel stripe structures.

11. The display device according to claim 10, further comprising: a display panel, wherein the polarizer is positioned on a light-emitting side of the display panel, and the polarizer is coated with an insulating film.

12. The display device according to claim 10, further comprising a sub-pixel unit and a black matrix surrounding the sub-pixel unit, wherein each of the linear polarization patterns is at least corresponding to one sub-pixel unit, and the touch sensing electrode in the polarizer is located in an area where the black matrix is located.

13. The display device according to claim 10, wherein the linear polarization pattern is composed of a set of parallel metal strips, the set of parallel metal strips are connected by a connecting line, and the linear polarization pattern and the touch sensing electrode in the same pattern region are connected.

14. The display device according to claim 10, wherein the touch sensing electrode has at least one of following structures: a planar structure, a mesh structure, and a set of parallel metal strips connected by one connecting line.

15. The display device according to claim 10, wherein the polarizer further comprises a plurality of signal lines connected to the touch sensing electrodes.

16. The display device according to claim 15, wherein the signal lines and the touch sensing electrodes are provided in the same layer.

* * * * *